(12) United States Patent
Mastio

(10) Patent No.: US 12,281,758 B2
(45) Date of Patent: Apr. 22, 2025

(54) SYSTEM FOR THE THERMAL COMPRESSION OF A GAS

(71) Applicant: EIFHYTEC, Strasbourg (FR)

(72) Inventor: Simon Mastio, Niederroedern (FR)

(73) Assignee: EIFHYTEC, Strasbourg (FR)

( * ) Notice: Subject to any disclaimer, the term of this patent is extended or adjusted under 35 U.S.C. 154(b) by 50 days.

(21) Appl. No.: 18/550,834

(22) PCT Filed: Mar. 15, 2022

(86) PCT No.: PCT/EP2022/056640
§ 371 (c)(1),
(2) Date: Sep. 15, 2023

(87) PCT Pub. No.: WO2022/194837
PCT Pub. Date: Sep. 22, 2022

(65) Prior Publication Data
US 2024/0167629 A1    May 23, 2024

(30) Foreign Application Priority Data

Mar. 17, 2021    (FR) ........................... 2102675

(51) Int. Cl.
*F17C 5/06*    (2006.01)
(52) U.S. Cl.
CPC .......... *F17C 5/06* (2013.01); *F17C 2221/011* (2013.01); *F17C 2221/012* (2013.01);
(Continued)
(58) Field of Classification Search
CPC ............... F17C 5/06; F17C 2221/011; F17C 2221/012; F17C 2221/014;
(Continued)

(56) References Cited

U.S. PATENT DOCUMENTS

| 2012/0028140 A1* | 2/2012 | Sutherland | ............ F04B 53/162 429/408 |
| 2016/0201658 A1 | 7/2016 | Arapkoules | |

FOREIGN PATENT DOCUMENTS

| DE | 10037163 A1 | 1/2002 |
| ES | 2259492 A1 | 10/2006 |
| RU | 2509256 C2 * | 3/2014 |

OTHER PUBLICATIONS

RU-2509256-C2 (English Translation) (Year: 2014).*
(Continued)

*Primary Examiner* — Craig M Schneider
*Assistant Examiner* — Christopher M Afful
(74) *Attorney, Agent, or Firm* — Leason Ellis LLP

(57) ABSTRACT

The present invention relates to a system for the thermal compression of a gas, characterized in that it comprises a source (1), a target (2) and at least one group of reservoirs (3) each one comprising at least two reservoirs (3), the system comprising a heating means (4) and a cooling means (5) for heating and cooling the contents of each reservoir, each group further comprising: —transfer means (6a, 6b) allowing gas to be transferred directly from the source to each reservoir and directly from each reservoir to the target, and—for each reservoir (3) of the group, two-way transfer means (7) allowing gas to be transferred directly between this reservoir (3) and at least one other reservoir (3) of the group. The present invention also relates to a cyclic method for the thermal compression of a gas in a plurality of reservoirs (3) of at least one group of a system according to the invention.

6 Claims, 3 Drawing Sheets

(52) U.S. Cl.
CPC .. *F17C 2221/014* (2013.01); *F17C 2221/017* (2013.01); *F17C 2221/033* (2013.01); *F17C 2223/0123* (2013.01); *F17C 2223/035* (2013.01); *F17C 2225/0123* (2013.01); *F17C 2225/036* (2013.01); *F17C 2227/0164* (2013.01); *F17C 2227/0309* (2013.01); *F17C 2227/0355* (2013.01); *F17C 2250/01* (2013.01); *F17C 2270/0168* (2013.01); *F17C 2270/0184* (2013.01)

(58) Field of Classification Search
CPC .......... F17C 2221/017; F17C 2221/033; F17C 2223/0123; F17C 2223/035; F17C 2225/0123; F17C 2225/036; F17C 2227/0164; F17C 2227/0309; F17C 2227/0355; F17C 2250/01; F17C 2270/0168; F17C 2270/0184; F04B 53/162; F04B 15/00; F04B 23/02; F04B 19/24
USPC ............................................................ 141/4
See application file for complete search history.

(56) References Cited

OTHER PUBLICATIONS

International Search Report and Written Opinion for corresponding International Application No. PCT/EP2022/056640, dated Jun. 7, 2022.

\* cited by examiner

[Fig. 1]
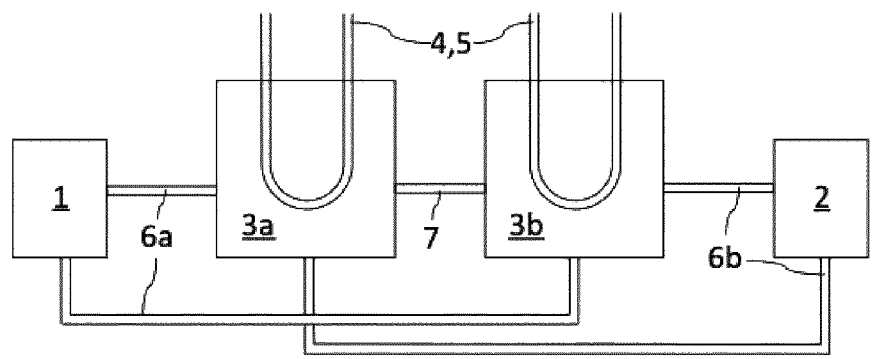
[Fig. 2]
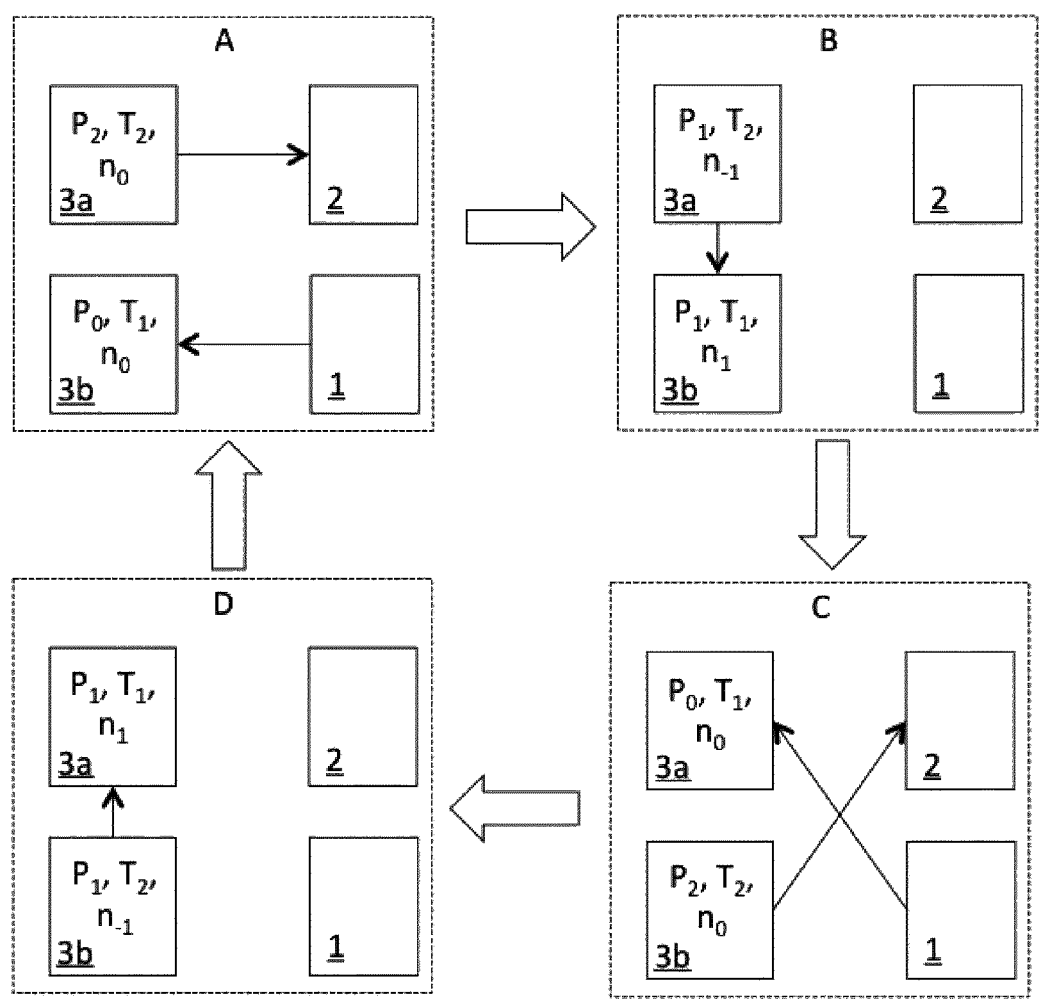

[Fig. 3]
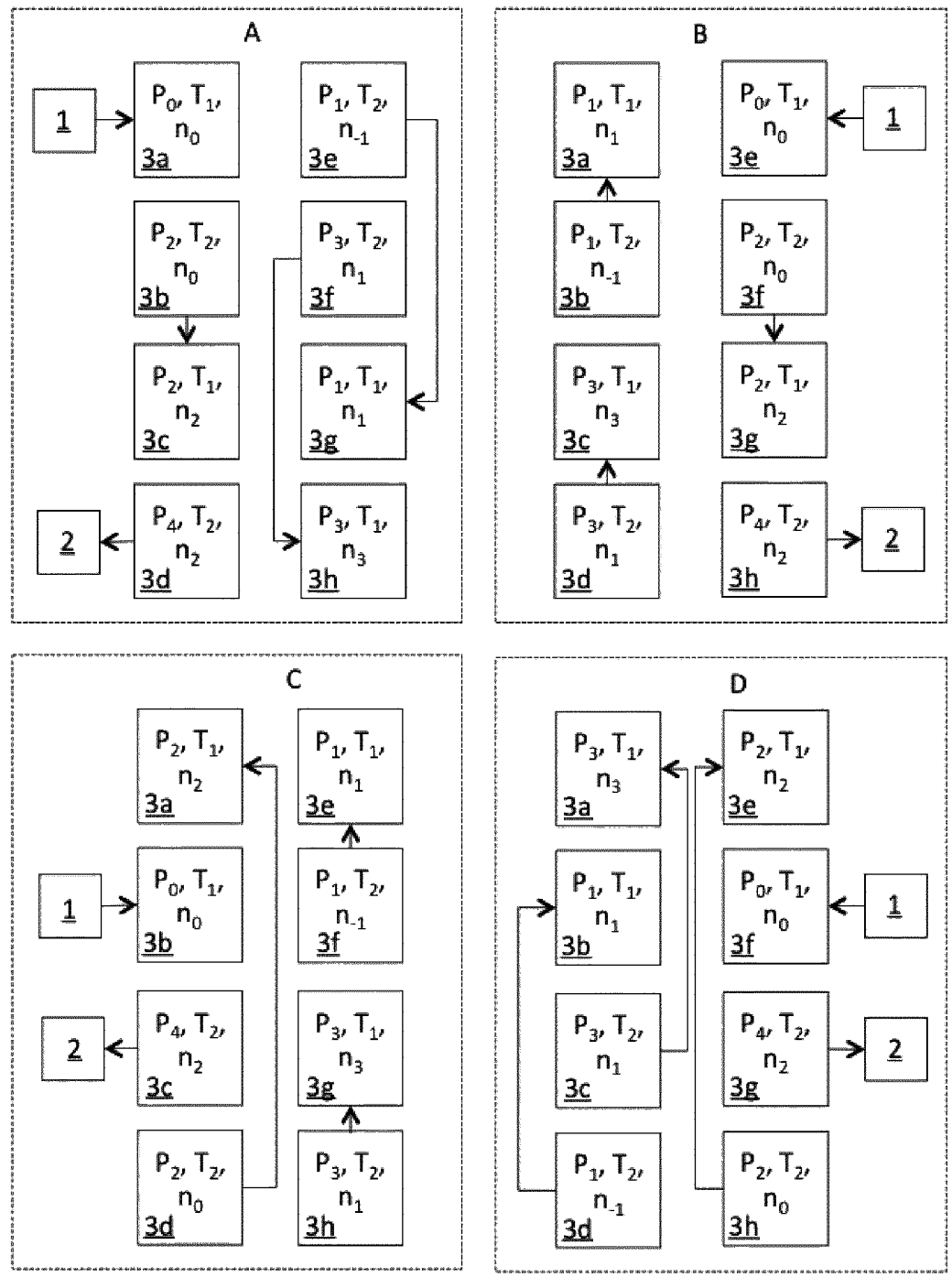

[Fig. 4]
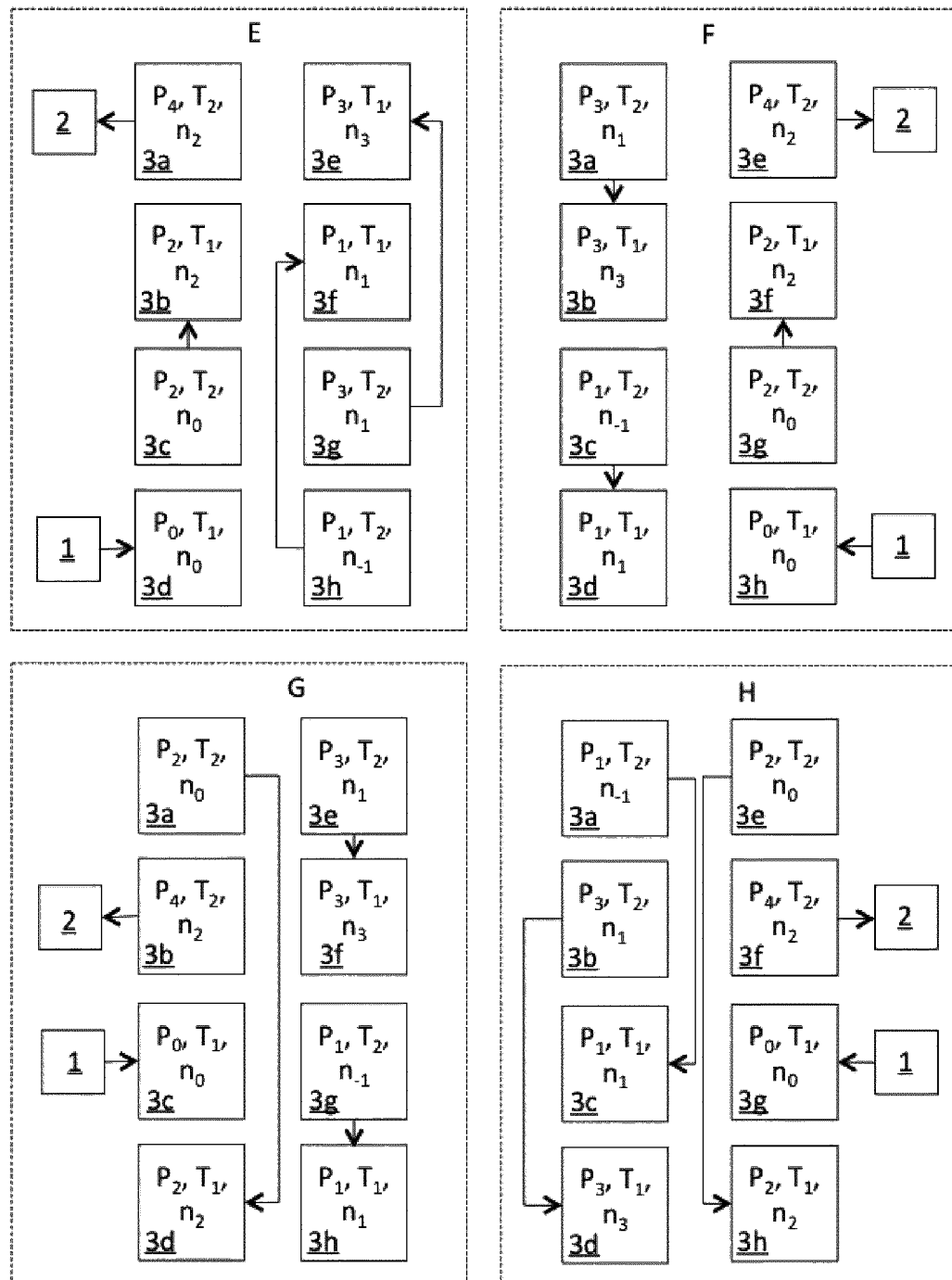

SYSTEM FOR THE THERMAL COMPRESSION OF A GAS

CROSS-REFERENCE TO RELATED PATENT APPLICATIONS

This application is a U.S. National Stage Application under 35 U.S.C. § 371 of International Patent Application No. PCT/EP2022/056640 filed Mar. 15, 2022, which claims the benefit of priority of French Patent Application number 2102675 filed Mar. 17, 2021, both of which are incorporated by reference in their entireties. The International Application was published on Sep. 22, 2022, as International Publication No. WO/2022/194837.

The present invention is in the field of gas compression. It concerns a system for the thermal compression of a gas, in particular dihydrogen.

Against a backdrop of strong growth in low-carbon solutions for mobility and the transport of goods and passengers, dihydrogen appears to be a promising fuel. Its use, combined with a fuel cell and an electric motor in a vehicle, could represent an alternative to fossil fuels or to the use of electric accumulators commonly used to power electric motors.

Due to its low density, dihydrogen must be compressed to a pressure of around 700 bar before it can be used as a fuel. It is usually delivered to service stations at a pressure of 200 bar, then compressed on site in a compressor to pressures ranging from 450 to 1000 bar.

This compressor is usually a mechanical one, which has several drawbacks. Moving parts lead to hydrogen leakage. Pistons are not lubricated, as this would introduce impurities into the dihydrogen, which would damage the fuel cell, so they wear out quickly. In addition, these compressors consume electricity, which represents a significant cost and worsens the environmental balance of dihydrogen. Last but not least, mechanical compressors generate high levels of noise pollution, which is particularly problematic at city service stations.

In response to these problems, thermochemical metal hydride compressors have been developed. Metal powders absorb dihydrogen at low pressure to form metal hydrides. These hydrides are then heated, releasing dihydrogen at high pressure. Ideally, these compressors operate between 20 bar and 500 bar. Outside this operating range, it is difficult to find metal powders capable of compression at temperature levels compatible with industrial standards. In particular, for very high-pressure levels, the energy required to further increase pressure is too great compared to a mechanical compressor, which consumes energy of the order of the ratio between outlet pressure and inlet pressure. A thermochemical compressor can therefore be combined with a mechanical compressor to reach the final pressure stages.

Alternatively, thermal compressors are available. US20120028140 proposes a compressor comprising a plurality of reservoirs connected in series, with the pressure rising between two consecutive reservoirs by heating the upstream reservoir. This method does not achieve high flow rates and consumes too much energy.

One object of the present invention is to provide an energy-efficient compressor, particularly for pressures in excess of 500 bar, without the problems of wear, power consumption, noise and leakage associated with mechanical compressors.

The object of the present invention is to respond at least in part to the aforementioned objects by proposing a cyclic process for the thermal compression of a gas wherein several reservoirs of a group perform a cycle during which they perform a pressure rise in contact with a reservoir or a succession of hotter reservoirs, then a pressure drop in order to raise the pressure of other cooler reservoirs. To this end, a cyclic process is proposed for the thermal compression of a gas in a plurality of reservoirs of at least one group of a system according to the invention, each cycle comprising the following steps for each reservoir of each group:

cooling the gas contained in the reservoir and transferring gas from the source to the reservoir, transfer of gas from a donor reservoir to said reservoir, said donor reservoir being the one whose gas is at the lowest pressure among the reservoirs of said group whose gas is at a higher pressure and temperature than the gas of said reservoir, until equalization of the pressures in said reservoir and said donor reservoir, if necessary, repetition of this step as long as there is another reservoir of said group whose gas is at a higher pressure and temperature than the gas of said reservoir, heating of the gas contained in the reservoir and transfer of gas from the reservoir to the target, transfer gas from said reservoir to a receiving reservoir, said receiving reservoir being the one whose gas is at the highest pressure among the reservoirs of said group whose gas is at a lower pressure and temperature than the gas of said reservoir, until equalization of the pressures in said reservoir and said receiving reservoir, if necessary repeating this step as long as there is another reservoir of said group whose gas is at a lower pressure and temperature than the gas of said reservoir, the step of cooling the gas contained in the reservoir and transferring gas from the source to said reservoir being carried out successively for each reservoir of said group.

Thanks to these arrangements, the gas can be compressed to a high pressure by thermal compression, thus avoiding problems of noise and wear on mechanical parts. This process is particularly energy-efficient, since the heat used to raise the pressure in one reservoir is used to compress the contents of other reservoirs as the pressure drops, and compression can take place in cascade.

According to further features:

said process can take place in a plurality of reservoirs of two groups, whereby the steps of cooling the gas contained in one reservoir and transferring the gas from the source can take place in turn to one of the reservoirs of one group, and then to one of the reservoirs of the other group, thereby optimizing the process, and in particular enabling the system to be fed and compressed gas to be produced continuously, during the step of transferring gas from a donor reservoir of the same group whose gas is at a higher pressure and temperature to said reservoir, the transferred gas can be cooled to reduce the temperature rise of the contents of said reservoir, thereby maintaining the temperature difference between a reservoir rising in pressure and a reservoir falling in pressure, this difference making it possible to optimize the compression of the gas in said reservoir, each group of reservoirs can comprise at least three, preferably at least four reservoirs, and the two transfer steps can each be repeated at least twice, preferably at least three times, enabling the gas to be subjected to several pressure stages, and thus to achieve a greater pressure rise for a given temperature difference, said process can also include a gas compression step, prior to transfer from the source to a reservoir, in a metal hydride compressor, thus combining an initial compression offering the advantages of a hydride compressor, followed by thermal compression when high pressure values make the hydride compressor less suitable, during the step of cooling the gas contained in a first reservoir, heat can be extracted from said first reservoir and used in the step of reheating the gas contained in a second reservoir, thus optimizing the energy consumption of the process, the step of transferring gas from the source to a first reservoir can take place simultaneously with the step of transferring gas from a second reservoir to a receiving reservoir or to the target, thus optimizing the cycle, with several different steps taking place at the same time in several different reservoirs of the system, or even of the same group.

The present invention also concerns a system for the thermal compression of a gas, characterized in that it comprises a source, a target, and at least one group of reservoirs each comprising at least two reservoirs, the said system comprising a means of heating and a means of cooling the contents of each reservoir, each group further comprising:

transfer means for transferring gas directly from said source to each reservoir and directly from each reservoir to said target, and for each reservoir of said group, bidirectional transfer means enabling gas to be transferred directly between this reservoir and at least one other reservoir of said group.

Thanks to these arrangements, the gas can be compressed to a high pressure by thermal compression, thus avoiding problems of noise and wear on mechanical parts, while enabling an energy-efficient process.

According to further features:

said gas may be dihydrogen, which is a relevant embodiment of the invention, as dihydrogen often needs to be compressed to high pressures to be usable, particularly in transport; it may also be N2, O2, CH4 or Helium, for example, said system can comprise two groups of reservoirs, thus optimizing its operation, and in particular enabling the system to be supplied and compressed gas to be produced continuously, said system can comprise at least three, preferably at least four, reservoirs in each group, enabling several pressure stages to be applied to the gas, and thus achieving a greater pressure rise for a given temperature difference, the heating means can include a source of waste heat, such as a biomass dihydrogen production plant or an electrolyser, enabling the heat produced to be recovered, thereby reducing the energy costs consumed by the system, the cooling means can include a source of fatal cold, such as liquid nitrogen storage or a return from a chilled water loop, thus recovering the available cold and reducing the energy consumed by the system, the source can include an evaporation gas outlet from a liquid dihydrogen storage reservoir, enabling cold dihydrogen to be supplied to the reservoir to be fed by the source, and thus achieving a particularly efficient first compression stage, all reservoirs in the same group can have the same volume, simplifying the system.

The present invention will be better understood on reading the detailed description that follows, with reference to the appended figures wherein:

FIG. 1 is a schematic view of a thermal gas compression system according to one embodiment of the invention, FIG. 2 is a schematic view of the steps involved in a thermal gas compression process as described in FIG. 1, FIG. 3 is a schematic view of the first stages of a thermal gas compression process according to a preferred embodiment of the invention, FIG. 4 is a schematic view of the steps completing the process begun in FIG. 3.

The thermal gas compression system illustrated in FIG. 1 comprises a source 1, a target 2 and one or more groups of reservoirs 3.

The system according to the invention enables gas to be compressed from a source 1, at which the gas is at a pressure $P_0$, to a pressure $P_{target}$ The gas concerned by the invention is preferably dihydrogen. However, it can also be any other gas, such as oxygen or nitrogen.

The reservoirs 3 are able to contain a certain volume of said gas in a sealed manner. Within a group, the reservoirs 3 preferably all have the same volume, for example 50 liters.

The thermal compression system comprises means for heating 4 and cooling 5 the contents of each reservoir 3. The heating means 4 and cooling means 5 bring a heat transfer fluid into contact with the contents of each reservoir 3. If the heat transfer fluid is warmer, respectively colder, than the contents of a reservoir 3, it can be used to heat, respectively cool, said contents.

Heating means 4 can also be an electrical resistor immersed in the reservoir.

Heater 4 can be connected to an electrolyzer or a biomass dihydrogen production unit. Thus, if the gas is dihydrogen, the heat generated to produce this dihydrogen can be recovered in the thermal compression system. Depending on where the system is installed, other locally available sources of waste heat can be connected to the heating system to reduce energy costs. This could be a waste collection site, for example, or any other industrial site where heat is generated.

The thermal compression system further comprises transfer means 6a for transferring gas directly from the source 1 to each reservoir 3 of a group, and transfer means 6b for transferring gas directly from each reservoir 3 of a group to the target 2. A direct transfer here refers to a transfer that does not pass through another reservoir 3 of the same or another group, or through the source 1 or target 2.

Finally, the thermal compression system includes bi-directional transfer means (7) enabling gas to be transferred directly from each reservoir in a group to each other reservoir in the same group. A direct transfer here refers to a transfer that passes neither through another reservoir 3 of the same group or of another group, nor through the source 1 or target 2. So, considering any pair of reservoirs 3 of the same group, it is possible to transfer gas directly between these two reservoirs 3, in both directions.

The present invention relates to a cyclic process for thermally compressing a gas in a plurality of reservoirs 3 in at least one group. Each cycle comprises the following steps for each reservoir 3a of each group:

cooling the gas contained in reservoir 3a to a cold temperature $T_1$, and transferring the gas from source 1 to reservoir 3a. At the end of this step, reservoir 3a contains gas at pressure $P_0$ and temperature $T_1$.

transfer of gas from another donor reservoir 3 to said reservoir 3a. The donor reservoir 3 is the one whose gas is at the lowest pressure among the reservoirs 3 of the same group whose gas is at a higher pressure and temperature than the gas contained in said reservoir 3a. The transfer takes place automatically when the bidirectional transfer means 7 is opened between reservoir 3a and donor reservoir 3, until the pressures in reservoir 3a and donor reservoir 3 equalize. It is during this step that the gas contained in said reservoir 3a is compressed. At the end of the first occurrence of this step, reservoir 3a contains gas at a pressure $P_1$ and a temperature $T_1$. This step can be repeated several times, as long as there is another reservoir 3 of said group whose gas is at a higher pressure and temperature than the gas contained in said reservoir 3a. The step may, for example, be repeated twice if the group comprises three reservoirs 3, or three times if the group comprises four reservoirs 3. Each time this step is repeated, the reservoir 3a rises one pressure stage. At the end of this step, reservoir 3a contains gas at a pressure $P_K$ and a temperature $T_1$, with K equal to the number of repetitions of the transfer step.

heating of the gas contained in reservoir 3a to a hot temperature $T_2$, enabling a final pressure stage to be built up, and transfer of gas from said reservoir 3a to target 2. At the end of this stage, reservoir 3a contains gas at a pressure $P_{K+1}$ and a temperature $T_2$. The pressure $P_{K+1}$ is close to, or equal to, the pressure $P_{target}$.

transferring gas from said reservoir 3a to another receiving reservoir 3. The receiving reservoir 3 is the one whose gas is at the highest pressure among the reservoirs 3 of the same group whose gas is at a lower pressure and temperature than the gas in said reservoir 3a. The transfer takes place automatically when the bidirectional transfer means 7 is opened between the reservoir 3a and the receiving reservoir 3, until the pressures in said reservoir 3a and said receiving reservoir 3 equalize. At the end of the first occurrence of this step, reservoir 3a contains gas at a pressure close to or equal to $P_K$ and a temperature $T_2$. This step can be repeated several times, as long as there is another reservoir 3 in the group whose gas is at a lower pressure and temperature than the gas in reservoir 3a. The step may, for example, be repeated twice if the group comprises three reservoirs 3, or three times if the group comprises four reservoirs 3. Each repetition of this step enables reservoir 3a to raise another reservoir 3 in the same group by one pressure stage. At the end of this step and its repetition until the end, reservoir 3a contains gas at a pressure close to or equal to $P_1$ and a temperature $T_2$.

If all the reservoirs 3 in the group have the same volume, the amount of gas in reservoir 3 can also be determined at each stage:

at the end of the source 1 cooling and transfer step, reservoir 3a contains $n_0$ moles of gas, at the end of one occurrence of the transfer step from a donor reservoir 3 to said reservoir 3a, said reservoir 3a contains $n_1$ moles of gas, at the end of the entire transfer step from one or more donor reservoirs 3 to said reservoir 3a, said reservoir 3a contains $n_K$ moles of gas, at the end of the heating step and transfer to target 2, reservoir 3a contains $n_{K-1}$ moles of gas, at the end of one occurrence of the transfer step from said reservoir 3a to a receiving reservoir 3, said reservoir 3a contains $n_{K-2}$ moles of gas, at the end of the entire transfer step from said reservoir 3a to one or more receiving reservoirs, said reservoir 3a contains $n_{-1}$ moles of gas.

The step of cooling the gas contained in the reservoir and transferring gas from the source to said reservoir 3a is carried out successively for each reservoir 3 of said group, and not for several reservoirs 3 at the same time. In this way, the reservoirs 3 of the group each pass through this step, in turn, and then follow the same cycle simultaneously, each with a time lag relative to the others.

In this process, the gas is thermally compressed by opening the transfer means between two reservoirs 3, the reservoir 3 wherein the gas is most compressed allowing the gas in the other reservoir to build up pressure. The reservoir receiving the gas is in a cold state and the reservoir delivering the gas is in a warm state. This ensures that, with an equivalent number of moles of gas in both reservoirs, the hot reservoir has a higher pressure and can give gas and increase the pressure in the cold reservoir. During each cycle, each reservoir 3 thus goes through a pressure build-up in a cold state, followed by a pressure drop in a hot state. During a cycle followed by a reservoir 3, it therefore only needs to be reheated and cooled once.

Preferably, during the step of transferring gas from another reservoir 3 of the same group whose gas is at a higher pressure and temperature to the said reservoir, the transferred gas is cooled. This maintains a cool temperature in the reservoir 3 receiving the hot gas, thus preserving the temperature differential with other hot reservoirs 3. The transferred gas can be cooled prior to arrival in the reservoir 3, for example in the bi-directional transfer means 7 between the two reservoirs 3. Alternatively, the transferred gas can be cooled after its arrival in reservoir 3, by cooling the entire contents of reservoir 3, for example by cooling means 5. In a preferred embodiment of the invention, the contents of a reservoir 3 cooled to cold temperature $T_1$ are kept at cold temperature $T_1$ until the reheating step. Similarly, the contents of a reservoir 3 reheated to the hot temperature $T_2$ are preferably kept at the hot temperature $T_2$ until the cooling step. This ensures that the temperature differential between $T_1$ and $T_2$ is always available when a hot reservoir 3 is connected to a cold reservoir 3 to build up the latter's pressure.

In a preferred embodiment of the invention, the step of transferring gas from the source 1 to a first reservoir 3a, . . . , 3h takes place simultaneously with the step of transferring gas from a second reservoir 3a, . . . , 3h to a receiving reservoir 3 or to the target 2. So when some reservoirs 3 in the system perform certain steps, other reservoirs 3 perform other process steps, saving time.

In order to optimize the energy consumption of the process according to the invention, during the step of cooling the gas contained in a first reservoir 3a, . . . , 3h, it is possible to use heat extracted from said first reservoir 3a, . . . , 3h in the step of heating the gas contained in a second reservoir 3a, . . . , 3h. For example, a heat transfer fluid can be circulated from the first reservoir 3a, . . . , 3h to the second reservoir 3a, . . . , 3h.

A group of reservoirs 3 comprises at least two reservoirs 3, for example three, preferably four reservoirs 3. The choice of the number of reservoirs 3 is made, along with the other system parameters, as a function of the number of stages required to compress the gas from pressure $P_0$ at source 1 to the desired pressure $P_{target}$ at target 2. Other parameters to be adjusted include the volumes of the reservoirs 3, and the temperatures $T_1$ and $T_2$ at which the reservoirs 3 are heated and cooled. It is advantageous to have an even number of reservoirs 3 in a group. This ensures that at each process step, one of the process steps takes place in each reservoir 3.

The system may comprise a single group of reservoirs 3, but preferably two groups of reservoirs 3. In fact, the total number of steps in the cycle described above, including the repetitions of the second and fourth steps, is equal to twice the number of reservoirs 3 in a group. When the system comprises a single group, only half of the steps can therefore be carried out at the same time by one of the reservoirs 3. In particular, the gas transfer stages from source 1 to target 2 do not take place for a single group at each stage of the cycle. It may therefore be possible to have two groups operating in parallel, enabling gas to be transferred from source 1 to one of the system's reservoirs 3, and from one of the system's reservoirs 3 to target 2, at each stage of the cycle. The number of reservoirs in each group can be different, but in order to obtain the above-mentioned advantage for two groups, it is necessary for both groups to have either an even or an odd number of reservoirs.

In a particular embodiment, additional reservoirs 3 can be provided to enable multi-stage heating and cooling. This is useful if the heating and cooling stages take longer than the transfer stages; typically, if these stages take twice as long as the transfer stages, it may be useful to carry out heating and cooling in two stages.

According to another particular design, an installation can be provided which initially operates between a first source pressure P0 and a target pressure P1. Then, in a second phase, part of the gas can be withdrawn at pressure P1 and used as a source at pressure P1. The device then raises the pressure to P2. This can be continued for as long as necessary to finally reach the target pressure.

In a preferred embodiment of the invention, the source gas pressure $P_0$ is between 400 and 600 bar, for example from a metal hydride compressor, and the target gas pressure $P_{target}$ is between 800 and 1000 bar. Two groups of four reservoirs 3 can be used in this configuration, with pressure build-up in one reservoir 3a, for example, taking place in the following stages: 500 bar at the source, then 560 bar, 635 bar, 725 bar after the three transfer stages from another hot reservoir 3, then a final stage leading to 810 bar when the reservoir 3a is reheated. Preferably, the gas cooling temperature $T_1$ and reheating temperature $T_2$ are between 280 and 310 K, for example 293.15 K, and between 360 and 390 K, for example 373.15 K, respectively. These temperatures can, of course, be used in conjunction with other pressure values.

To optimize energy consumption, the cooling temperature $T_1$ can be as low as possible, i.e. the ambient temperature or the temperature of the lowest cold source available on site. If liquid nitrogen is available on site, or a return from a chilled water circuit, or other cold fluids, for example, these can be used.

Alternatively, source 1 can be connected to an evaporator gas outlet of a liquid dihydrogen storage (boil-off gas), which is at a temperature of 15K, enabling cold dihydrogen to be supplied to the reservoir to be fed by the source.

The system according to the invention is particularly advantageous for small-scale installations, with a gas output at target 2 of between 1 and 5 kg per hour, for example.

Other applications are possible in terms of pressure/temperature:

source connected to an evaporation gas outlet of a liquid dihydrogen storage (boil-off gas):
  pressure $P_0$ at source 1: between 0.5 and 2 bar,
  pressure $P_{target}$ at target 2: between 5 and 50 bar,
  cooling temperature $T_1$: between 15 and 300 K,
  heating temperature $T_2$: between 300 and 400 K.
source connected to an output of fatal dihydrogen, co-produced by an industrial plant:
  pressure $P_0$ at source 1: between 0.5 and 3 bar,
  pressure $P_{target}$ at target 2: between 20 and 500 bar,
  cooling temperature $T_1$: between 253 and 353 K,
  heating temperature $T_2$: between 353 and 1000 K.
source connected to a low-temperature electrolyzer:
  pressure $P_0$ at source 1: between 1 and 50 bar,
  pressure $P_{target}$ at target 2: between 2 and 200 bar,
  cooling temperature $T_1$: between 253 and 293 K,
  heating temperature $T_2$: between 333 and 393 K.
source connected to a high-temperature electrolyzer:
  pressure $P_0$ at source 1: between 1 and 30 bar,
  pressure $P_{cible}$ at target 2: between 2 and 200 bar,
  cooling temperature $T_1$: between 253 and 293 K,
  heating temperature $T_2$: between 333 and 1073 K.
source connected to a thermochemical compressor, for example with metal hydrides:
  pressure $P_0$ at source 1: between 200 and 500 bar,
  pressure $P_{target}$ at target 2: between 400 and 1000 bar,
  cooling temperature $T_1$: between 253 and 293 K,
  heating temperature $T_2$: between 353 and 423 K.
source connected to a gas cylinder outlet:
  pressure $P_0$ at source 1: between 50 and 500 bar,
  pressure $P_{target}$ at target 2: between 100 and 1000 bar,
  cooling temperature $T_1$: between 253 and 293 K,
  heating temperature $T_2$: between 353 and 500 K.
source connected to a biomass dihydrogen production unit:
  pressure $P_0$ at source 1: between 1 and 5 bar,
  pressure $P_{target}$ at target 2: between 2 and 50 bar,
  cooling temperature $T_1$: between 253 and 293 K,
  heating temperature $T_2$: between 353 and 1073 K.

FIG. 2 illustrates an example of an embodiment wherein the system according to the invention comprises a group of two reservoirs 3a, 3b. The volumes of reservoirs 3a, 3b are equal. In FIG. 2, the arrows illustrate the gas flows. The state of each reservoir is noted after the gas transfers have been completed.

The cycle comprises four stages:

Step A:
  the gas contained in reservoir 3a is heated to temperature $T_2$ and part of this gas is transferred to target 2. At the end of this step, reservoir 3a contains no moles of gas, at pressure $P_2 = P_{target}$, and temperature $T_2$.
  the gas in reservoir 3b is cooled to temperature $T_1$ and gas is transferred from source 1 to reservoir 3b. At the end of this step, reservoir 3b contains no moles of gas, at pressure $P_0$, and temperature $T_1$.

step B:
  the bidirectional transfer means 7 is opened between reservoirs 3a and 3b, transferring gas from reservoir 3a to reservoir 3b. At the end of this step, reservoir 3a contains $n_{-1}$ moles of gas, at pressure $P_1$, and temperature $T_2$, and reservoir 3b contains $n_1$ moles of gas, at pressure $P_1$, and temperature $T_1$.

Steps C and D are identical to steps A and B, with reservoirs 3a and 3b swapped. At the end of step D, the cycle can be resumed at step A.

FIGS. 3 and 4 illustrate an example of an embodiment wherein the system according to the invention comprises two groups of four reservoirs 3a to 3d and 3e to 3h. The volumes of reservoirs 3a to 3d are equal. The volumes of reservoirs 3e to 3h are equal. In FIGS. 3 and 4, the arrows illustrate gas flows. The state of each reservoir is noted after the gas transfers have been completed.

The cycle consists of eight steps A to H. We will describe the cycle followed by reservoir 3a:

step A: the gas contained in reservoir 3a is cooled to temperature $T_1$ and gas is transferred from source 1 to reservoir 3a. At the end of this step, reservoir 3a contains $n_0$ moles of gas, at pressure $P_0$, and temperature $T_1$, step B: the bidirectional transfer means 7 is opened between reservoirs 3a and 3b, causing gas to be transferred from reservoir 3b to reservoir 3a. At the end of this step, reservoir 3a contains $n_1$ moles of gas, at pressure $P_1$, and temperature $T_1$.

step C: the bidirectional transfer means 7 is opened between reservoirs 3a and 3d, causing gas to be transferred from reservoir 3d to reservoir 3a. At the end of this step, reservoir 3a contains $n_2$ moles of gas, at pressure $P_2$, and temperature $T_1$.

step D: the bidirectional transfer means 7 is opened between reservoirs 3a and 3c, causing gas to be transferred from reservoir 3c to reservoir 3a. At the end of this step, reservoir 3a contains $n_3$ moles of gas, at pressure $P_3$, and temperature $T_1$.

step E: the gas contained in reservoir 3a is heated to temperature $T_2$ and part of this gas is transferred to target 2. At the end of this step, reservoir 3a contains $n_2$ moles of gas, at pressure $P_4=P_{target}$, and temperature $T_2$.

step F: the bidirectional transfer means 7 is opened between reservoirs 3a and 3b, causing gas to be transferred from reservoir 3a to reservoir 3b. At the end of this step, reservoir 3a contains $n_1$ moles of gas, at pressure $P_3$, and temperature $T_2$.

step G: the bidirectional transfer means 7 is opened between reservoirs 3a and 3d, causing gas to be transferred from reservoir 3a to reservoir 3d. At the end of this step, reservoir 3a contains $n_0$ moles of gas, at pressure $P_2$, and temperature $T_2$.

step H: the bidirectional transfer means 7 is opened between reservoirs 3a and 3c, causing gas to be transferred from reservoir 3a to reservoir 3c. At the end of this step, reservoir 3a contains $n_{-1}$ moles of gas, at pressure $P_1$, and temperature $T_2$. At the end of step H, the cycle can be resumed at step A.

All reservoirs 3a to 3h follow the above cycle, of course exchanging with the relevant reservoirs 3 at each transfer stage:

reservoir 3b begins the above cycle at step C,
reservoir 3c begins the above cycle at step G,
reservoir 3d begins the above cycle at step E,
reservoir 3e begins the above cycle at step B,
reservoir 3f begins the above cycle at step D,
reservoir 3g begins the above cycle at step H,
reservoir 3h begins the above cycle at step F, The presence of two groups in the system means that, during each stage of the cycle, a reservoir 3 receives gas from source 1 and a reservoir 3 sends gas to target 2. For example, in step A, reservoir 3d of the first group of reservoirs 3 sends gas to the target 2, in step B, reservoir 3h of the second group of reservoirs 3, then in step C, reservoir 3c of the first group of reservoirs 3, and so on. On the other hand, in step A, reservoir 3a of the first group of reservoirs 3 receives gas from source 1, in step B, reservoir 3e of the second group of reservoirs 3, then in step C, reservoir 3b of the first group of reservoirs 3, and so on.

Considering this example, and carrying out the heating and cooling stages over the duration of two transfer stages, this leads to the provision of ten reservoirs 3 instead of eight. The ten reservoirs then form a single group, and each reservoir 3 can be linked to three other reservoirs 3 out of the ten, by bidirectional transfer means; each reservoir 3 must of course also be linked to the source and target by transfer means.

Although the above description is based on particular embodiments, it is by no means limitative of the scope of the invention, and modifications may be made, in particular by substitution of technical equivalents or by different combination of all or some of the features developed above.

The invention claimed is:

1. A cyclic process for the thermal compression of a gas in a plurality of reservoirs of at least one group of reservoirs, each cycle comprising for each reservoir of said plurality of reservoirs the following steps:

cooling of the gas contained in the reservoir and transfer of gas from the source to said reservoir, transfer of gas from a donor reservoir to said reservoir, said donor reservoir being at a higher pressure and temperature than the gas of said reservoir and of the same group, said donor reservoir being the one whose gas is at the lowest pressure among the reservoirs of said group whose gas is at a higher pressure and temperature than the gas of said reservoir, until equalization of the pressures in said reservoir and said donor reservoir, repeating this step for as long as there is another reservoir of said group whose gas is at a higher pressure and temperature than the gas in said reservoir, heating of the gas contained in the reservoir and transfer of gas from said reservoir to the target, transfer of gas from said reservoir to a receiving reservoir, said receiving reservoir being at a lower pressure and temperature than the gas from said reservoir, said receiving reservoir being that whose gas is at the highest pressure among the reservoirs of said group whose gas is at a lower pressure and temperature than the gas from said reservoir, until equalization of the pressures in said reservoir and said receiving reservoir, repeating this step for as long as there is another reservoir of said group whose gas is at a lower pressure and temperature than the gas in said reservoir, the step of cooling the gas contained in the reservoir and transferring gas from the source to said reservoir being carried out successively for each reservoir of said group.

2. Process according to claim 1, wherein during the step of transferring gas from a donor reservoir of the same group whose gas is at a higher pressure and temperature to said reservoir, the transferred gas is cooled to reduce the temperature rise of the contents of said reservoir.

3. Process according to claim 1, further comprising a gas compression step, prior to its transfer from the source to a reservoir, in a metal hydride compressor.

4. Process according to claim 1, wherein during the step of cooling the gas contained in a first reservoir, heat is extracted from said first reservoir and is used in the step of reheating the gas contained in a second reservoir.

5. Process according to claim 1, wherein at least two gas transfer steps are carried out in the same time, the first concerning two entities from among the source, the target and a reservoir, the second concerning two entities not concerned by the first.

6. Process according to claim 5, wherein the step of transferring gas from the source to a first reservoir takes place simultaneously with the step of transferring gas from a second reservoir to a receiving reservoir or to the target.

* * * * *